United States Patent
Uchiyama et al.

(10) Patent No.: US 8,530,112 B2
(45) Date of Patent: Sep. 10, 2013

(54) ELECTRICITY-GENERATION DEVICE

(75) Inventors: Naoki Uchiyama, Hamamatsu (JP);
Yasuyuki Uchiyama, Hamamatsu (JP);
Seigou Nakabayashi, Hamamatsu (JP)

(73) Assignee: Kabushiki Kaisha Atsumitec, Shizuoka (JP)

(*) Notice: Subject to any disclaimer, the term of this patent is extended or adjusted under 35 U.S.C. 154(b) by 0 days.

(21) Appl. No.: 13/640,197

(22) PCT Filed: Feb. 21, 2011

(86) PCT No.: PCT/JP2011/053679
§ 371 (c)(1),
(2), (4) Date: Oct. 9, 2012

(87) PCT Pub. No.: WO2011/125378
PCT Pub. Date: Oct. 13, 2011

(65) Prior Publication Data
US 2013/0029250 A1    Jan. 31, 2013

(30) Foreign Application Priority Data
Apr. 7, 2010    (JP) .................................. 2010-088648

(51) Int. Cl.
*H01M 8/10*    (2006.01)
*H01M 8/12*    (2006.01)

(52) U.S. Cl.
USPC ............ 429/508; 429/513; 429/465; 429/466

(58) Field of Classification Search
None
See application file for complete search history.

(56) References Cited

U.S. PATENT DOCUMENTS

| 6,083,636 A * | 7/2000 | Hsu ............................ 429/434 |
| 2004/0146774 A1* | 7/2004 | Champion et al. ............... 429/40 |
| 2004/0166386 A1* | 8/2004 | Herman et al. ................. 429/22 |
| 2008/0187806 A1* | 8/2008 | Horiuchi et al. ............... 429/30 |

FOREIGN PATENT DOCUMENTS

| JP | 2004-349140 | 12/2004 |
| JP | 2007-220521 | 8/2007 |
| JP | 2007-273196 | 10/2007 |
| JP | 2007-317390 | 12/2007 |
| JP | 2008-270181 | 11/2008 |
| JP | 2010-009895 | 1/2010 |

OTHER PUBLICATIONS

Yano et al., Recent Advances in single-chamber solid oxide fuel cells: A review, Solid State Ionics 177 (2007) 3351-3359.*

* cited by examiner

*Primary Examiner* — Patrick Ryan
*Assistant Examiner* — Jose Colucci Rios
(74) *Attorney, Agent, or Firm* — Cozen O'Connor

(57) ABSTRACT

An electricity generation device includes: a tubular fuel cell having an electrolyte layer sandwiched between inside and outside electrodes to which a fuel gas is supplied, the fuel cell having an interior formed as an inside channel for the fuel gas; a cover pipe arranged around the fuel cell with a gap provided between the outside electrode and the cover pipe; a connecting member connecting the fuel cell and the cover pipe to each other and permitting an outside channel for the fuel gas to be formed around the fuel cell by making use of the gap; and a fuel gas pipe connected to each of opposite ends of the cover pipe and forming a flow path for the fuel gas in cooperation with the cover pipe.

3 Claims, 3 Drawing Sheets

ELECTRICITY-GENERATION DEVICE

RELATED APPLICATIONS

This is a U.S. National Phase Application under 35 USC 371 of International Application PCT/JP2011/053679 filed on Feb. 21, 2011.

This application claims the priority of Japanese application no. 2010-088648 filed Apr. 7, 2010, the content of which is hereby incorporated by reference.

TECHNICAL FIELD

The present invention relates to an electricity generation device for generating electricity by supplying a fuel gas to a fuel electrode of a fuel cell thereof.

BACKGROUND ART

A fuel cell comprises a fuel electrode and an air electrode sandwiching an electrolyte. A fuel gas or the like is supplied to the electrodes to generate electricity. In a solid oxide fuel cell (SOFC), in particular, a fuel electrode (hydrogen electrode) and an air electrode (oxygen electrode) are joined to an electrolyte made of a solid oxide. The fuel electrode is supplied with a fuel gas and the air electrode is supplied with air or the like, whereby high-output electric power can be generated. The solid oxide fuel cell can use, as the fuel gas, not only hydrogen gas but a gas containing a large amount of carbon monoxide (e.g., exhaust gas of a motor vehicle driven by an internal combustion engine).

Patent Document 1 discloses a solid oxide fuel cell with a cylindrical shape. In the fuel cell of Patent Document 1, pipe joints are screwed directly on the fuel cell to connect a gas tank to the fuel cell.

In this type of fuel cell, however, a porous solid is used for both the fuel and air electrodes, and therefore, a problem of strength arises if the electrodes are disposed in direct contact with other members. Specifically, the electrodes may possibly be damaged after a long period of use.

PRIOR ART DOCUMENT

Patent Document

Patent Document 1: Japanese Laid-open Patent Publication No. 2003-282128

SUMMARY OF THE INVENTION

Problems to be Solved by the Invention

The present invention provides an electricity generation device which can be improved in mounting strength or durability even though a tubular (cylindrical) fuel cell is connected to other members when in use and in which fuel or air can be supplied at a predetermined flow velocity to an outside electrode as well.

Means for Solving the Problems

An electricity generation device according to the present invention comprises: a tubular fuel cell including an electrolyte layer sandwiched between inside and outside electrodes to which a fuel gas is supplied, the fuel cell having an interior formed as an inside channel for the fuel gas; a cover pipe arranged around the fuel cell with a gap provided between the outside electrode and the cover pipe; a connecting member connecting the fuel cell and the cover pipe to each other and permitting an outside channel for the fuel gas to be formed around the fuel cell by making use of the gap; and a fuel gas pipe connected to each of opposite ends of the cover pipe and forming a flow path for the fuel gas in cooperation with the cover pipe.

Preferably, the gap is smaller than an inner diameter of the fuel cell.

Also, preferably, the connecting member includes two connecting members so arranged as to close upstream and downstream ends, respectively, of the outside channel and has through holes formed therein to permit the fuel gas to flow through the outside channel.

Advantageous Effects of the Invention

According to the present invention, the cover pipe is connected to the fuel gas pipe, and the fuel cell and the fuel gas pipe are not disposed in direct contact with each other for connection. Thus, by appropriately selecting the material of the cover pipe, it is possible to ensure required mounting strength and durability matching the structure and material of the fuel gas pipe to which the cover pipe is attached. Also, since the fuel cell and the cover pipe constitute a double pipe structure, the fuel gas can be supplied at a predetermined flow velocity also to the outside electrode (anode or cathode) located outside of the fuel cell.

Further, according to the present invention, the flow velocity of the fuel gas flowing through the gap between the fuel cell and the cover pipe can be further increased to increase the amount of the fuel gas supplied to the outside electrode located outside of the fuel cell.

According to the present invention, moreover, the connecting members are arranged at the respective upstream and downstream ends of the outside channel, and therefore, the fuel cell or the cover pipe or both are connected at their opposite ends to the respective connecting members, making it possible to stabilize the connection of the members. Also, since the through holes formed through the connecting members, the flow of the fuel gas through the outside channel is not hindered.

MODE FOR CARRYING OUT THE INVENTION

Figure 1:
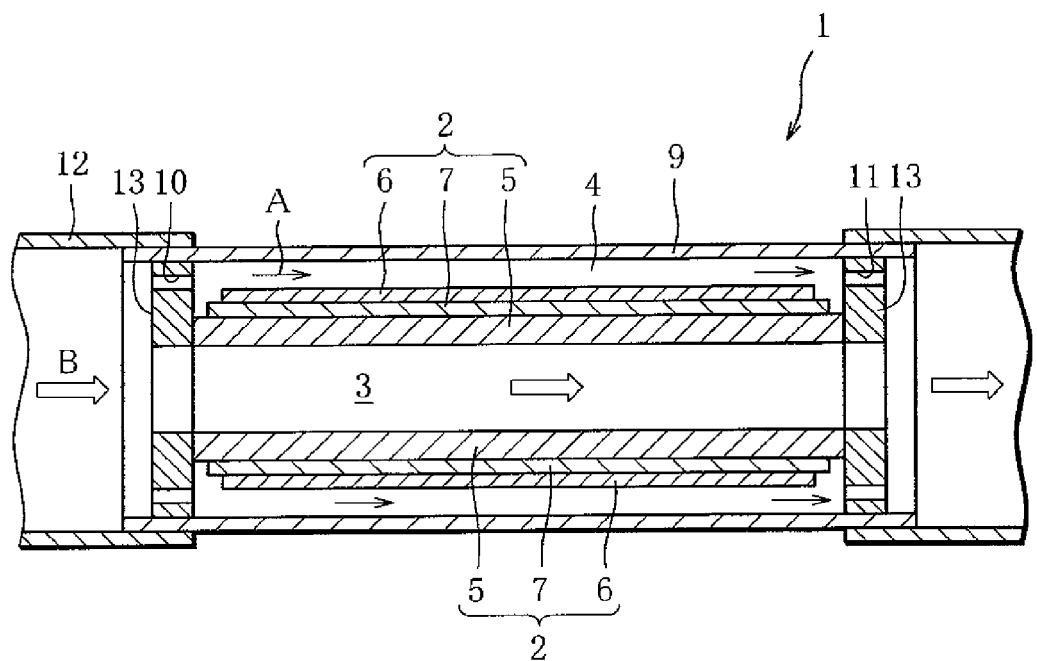
FIG. 1 is a schematic sectional view of an electricity generation device according to the present invention.

As illustrated in FIG. 1, an electricity generation device 1 according to the present invention includes a fuel cell 2, a cover pipe 9, connecting members 13, and fuel gas pipes 12. The fuel cell 2 is formed so as to be tubular in shape. The tubular fuel cell 2 is referred to also as a tube type fuel cell. In the illustrated example, the fuel cell 2 has a fuel electrode (anode) 5 as an inside electrode and an air electrode (cathode) 6 as an outside electrode respectively located inside and outside of the fuel cell 2. An electrolyte layer 7 made of a solid oxide is sandwiched between the fuel electrode 5 and the air electrode 6. That is, the fuel cell 2 is an SOFC. The cover pipe 9 is arranged around the fuel cell 2 with a gap therebetween. The cover pipe 9 also is tubular in shape and therefore, constitutes a double pipe structure in cooperation with the tubular fuel cell 2. In the illustrated example, the fuel cell 2 and the cover pipe 9 are nearly equal in length and are connected to each other by the connecting members 13 at respective opposite ends thereof. Since the fuel cell 2 and the cover pipe 9 are connected at their opposite ends by the connecting members 13, the connection of the two can be stabilized. The locations of the connecting members 13 may be changed as needed.

A fuel gas flows from an upstream side of the fuel gas pipe 12 in a direction indicated by arrows B. When passing the fuel cell 2, the fuel gas flows through both an inside channel 3 formed inside the fuel cell 2 and an outside channel 4 formed outside the fuel cell 2. Specifically, the fuel gas enters the outside channel 4 from the upstream-side fuel gas pipe 12 through inlet holes (through holes) 10 penetrating through the upstream-side connecting member 13, then flows in a direction indicated by arrows A, and enters the downstream-side fuel gas pipe 12 through outlet holes (through holes) 11 penetrating through the downstream-side connecting member 13. In the illustrated example, the upstream and downstream ends of the outside channel 4 are closed by the respective connecting members 13, but since the inlet and outlet holes 10 and 11 are formed through the respective connecting members 13, the fuel gas is not hindered from flowing into and out of the outside channel 4. Also, where the downstream end of the outside channel 4 is closed by the connecting member 13 as illustrated, negative pressure can be generated in the outlet holes 11 due to the flow velocity of the fuel gas passing through the inside channel 3, making it possible to create a flow of the fuel gas through the outside channel 4.

The fuel gas has hydrogen and oxygen mixed therein. Where the fuel gas is exhaust gas, hydrogen and oxygen in methane gas, carbon monoxide and the like contained in the exhaust gas are the reactants that react with the electrodes. Specifically, the air electrode 6 reduces oxygen, and the reduced oxygen ions pass through the electrolyte 7 and react, at the fuel electrode 5, with hydrogen in the exhaust gas, thus producing water. Electrons produced at the fuel electrode 5 at this time move through a circuit (not shown) and again ionize oxygen at the air electrode 6, so that electric current flows through the circuit, generating electricity.

The fuel cell 2 is connected to the fuel gas pipes 12 with the cover pipe 9 (and the connecting members 13) therebetween. The cover pipe 9 is disposed in direct contact with each fuel gas pipe 12 and connected thereto in a gastight fashion. Since the fuel cell 2 is connected to each fuel gas pipe 12 with the cover pipe 9 interposed therebetween, the fuel cell 2 and the fuel gas pipe 12 do not directly contact with each other. Thus, by appropriately selecting the material of the cover pipe 9, it is possible to ensure required mounting strength and durability matching the structure and material of the fuel gas pipe 12 to which the cover pipe 9 is attached. Consequently, even in cases where the fuel gas pipe 12 is an exhaust gas pipe of a motor vehicle, the electrodes can withstand vibration caused by traveling of the vehicle for a long period of time. Further, since the fuel cell 2 and the cover pipe 9 constitute a double pipe structure, the fuel gas can be supplied at a predetermined flow velocity also to the air electrode 6 located on the outer side of the fuel cell 2. By reducing the width of the outside channel 4, it is possible to increase the flow velocity of the fuel gas and thus the amount of the fuel gas supplied to the air electrode 6. If the outside channel width (gap between the fuel cell 2 and the cover pipe 9) is further reduced so as to be smaller than the radius of the inside channel 3, the cross-sectional area of the inside channel 3 can be increased to a certain extent and also the flow velocity of the fuel gas through the outside channel 4 can advantageously be increased. Where the fuel gas is exhaust gas, the concentrations of components that react with the electrodes are low, and therefore, it is crucially important to increase the flow velocity in this manner. In the case of using exhaust gas, a fuel reforming material (not shown) is preferably arranged upstream of the fuel cell 2. The fuel reforming material is used for converting hydrocarbons, water and the like, contained in the exhaust gas, into hydrogen to increase the concentration of hydrogen.

Figure 2:
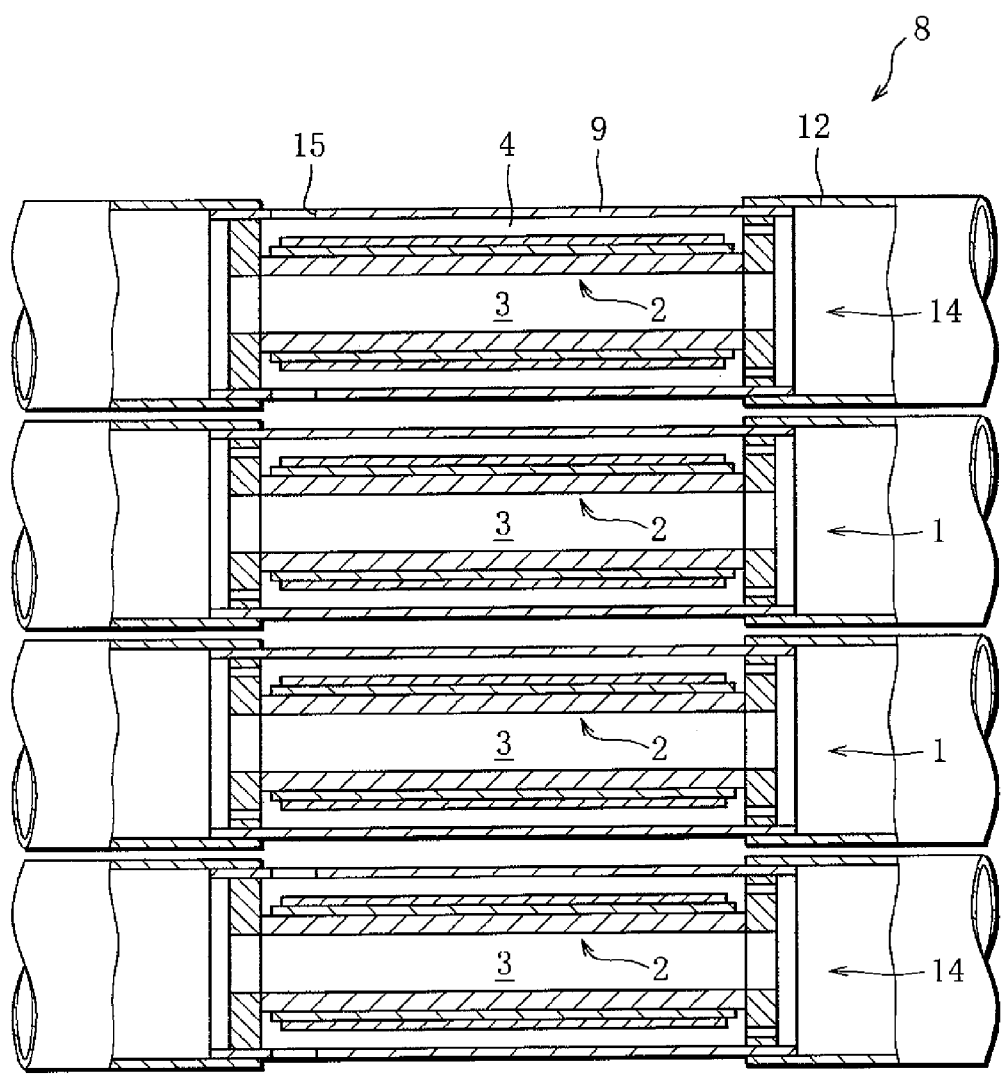
FIG. 2 is a schematic sectional view of an exemplary stack.
Figure 3:
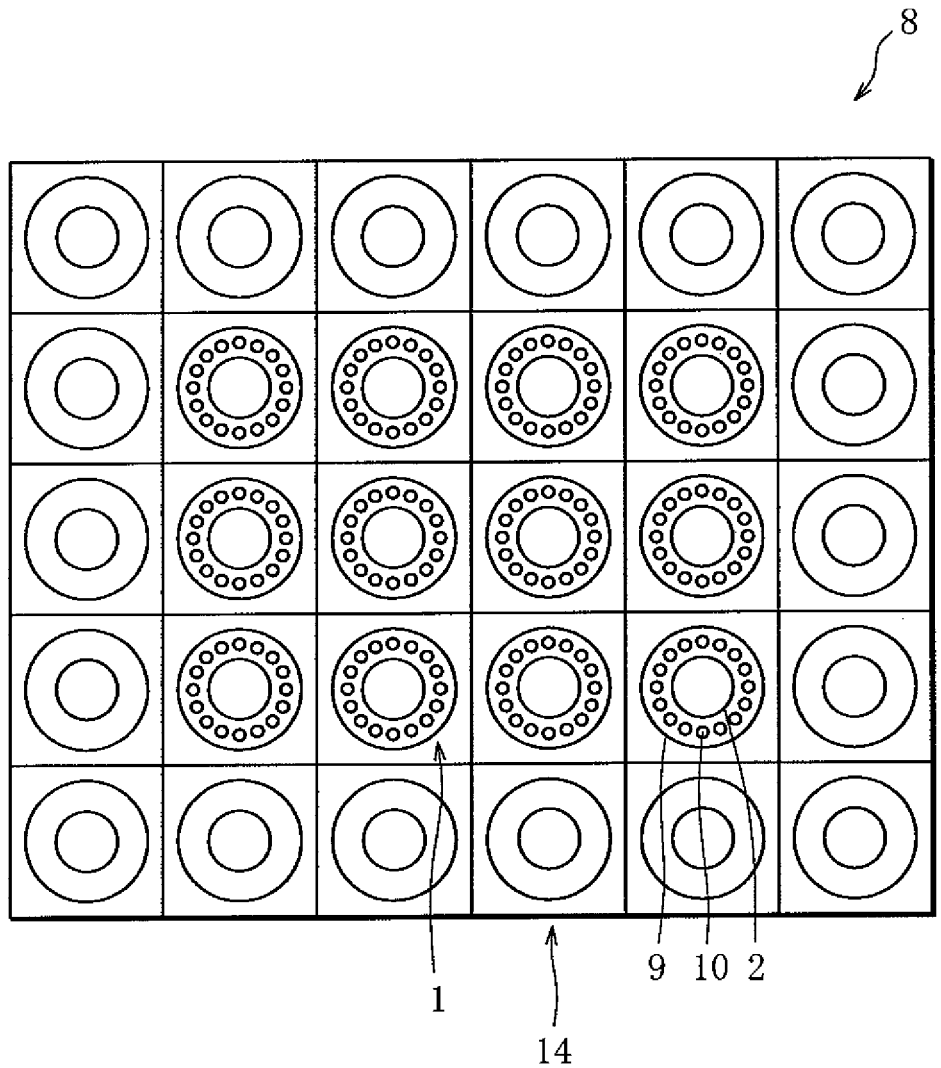
FIG. 3 is a schematic front view of another exemplary stack.

A plurality of electricity generation devices 1 may be used to construct a stack 8 shown in FIG. 2 or 3. In the example illustrated in FIG. 2, four electricity generation devices are stacked vertically, and the electricity generation device 1 of the present invention is used for the intermediate two of the stack 8. In the example illustrated in FIG. 3, a total of 30 electricity generation devices are used to construct a 6×5 stack 8. In this case, the electricity generation device 1 of the present invention is used for the 4×3, namely, 12 electricity generation devices located in the central portion of the stack 8. Since the fuel cell 2 and the cover pipe 9 constitute a double pipe structure to enhance the mounting strength and increase the flow velocity of the fuel gas, the electricity generation device 1 of the present invention is especially suited for use as those electricity generation devices which are located inside of the stack 8. For electricity generation devices 14 located outside, a conventional tube type fuel cell may be used. In the outside electricity generation devices 14 shown in FIG. 2, the fuel cell 2 and the cover pipe 9 also constitute a double pipe structure, and intake openings 15 are formed through the cover pipe 9 to introduce ambient air into the outside channel 4. Thus, the outside electricity generation device 14 preferably uses ambient air as the gas to be supplied to the air electrode 6.

EXPLANATION OF REFERENCE SIGNS 1 electricity generation device
2 fuel cell
3 inside channel
4 outside channel
5 fuel electrode
6 air electrode
7 electrolyte
8 stack
9 cover pipe
10 inlet hole
11 outlet hole
12 fuel gas pipe
13 connecting member
14 electricity generation device
15 intake opening

The invention claimed is:

1. An electricity generation device comprising:
a tubular fuel cell including an electrolyte layer sandwiched between inside and outside electrodes to which a fuel gas is supplied, the fuel cell having an interior defining an inside channel for the fuel gas;
a cover pipe arranged around the fuel cell, the cover pipe being positioned to define a gap between the outside electrode and the cover pipe;
a connecting member connecting the fuel cell to the cover pipe to define an outside channel for the fuel gas around the fuel cell via the gap; and
a fuel gas pipe connected to each of opposite ends of the cover pipe to form a flow path for the fuel gas in cooperation with the cover pipe to inside channel and to the outside channel,
wherein the fuel gas pipe is not in contact with the fuel cell.

2. The electricity generation device according to claim 1, wherein the gap is smaller than an inner diameter of the fuel cell.

3. The electricity generation device according to claim 1, wherein the connecting member includes first and second connecting members to close upstream and downstream ends of the outside channel, respectively, the connecting members having through holes to permit the fuel gas to flow through the outside channel.

* * * * *